US011004452B2

(12) United States Patent
Lee et al.

(10) Patent No.: US 11,004,452 B2
(45) Date of Patent: May 11, 2021

(54) METHOD AND SYSTEM FOR MULTIMODAL INTERACTION WITH SOUND DEVICE CONNECTED TO NETWORK

(71) Applicants: NAVER CORPORATION, Seongnam-si (KR); LINE CORPORATION, Tokyo (JP)

(72) Inventors: Hyeoncheol Lee, Seongnam-si (KR); Jin Young Park, Seongnam-si (KR)

(73) Assignees: NAVER CORPORATION, Seongnam-si (KR); LINE CORPORATION, Tokyo (JP)

( * ) Notice: Subject to any disclaimer, the term of this patent is extended or adjusted under 35 U.S.C. 154(b) by 0 days.

(21) Appl. No.: 16/598,449

(22) Filed: Oct. 10, 2019

(65) Prior Publication Data
US 2020/0043491 A1 Feb. 6, 2020

Related U.S. Application Data

(63) Continuation of application No. PCT/KR2018/002075, filed on Feb. 20, 2018.

(30) Foreign Application Priority Data

Apr. 14, 2017 (KR) .................. 10-2017-0048304

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/30* (2013.01); *G10L 25/90* (2013.01);
(Continued)

(58) Field of Classification Search
CPC .......... G06F 3/165; G06F 3/167; G06F 16/68; G06F 21/32; G10L 13/033; G10L 13/10;
(Continued)

(56) References Cited

U.S. PATENT DOCUMENTS 5,699,089 A * 12/1997 Murray ..................... G06F 3/16
715/823
7,286,651 B1 * 10/2007 Packingham ........... H04W 4/00
379/88.14
(Continued)

FOREIGN PATENT DOCUMENTS

JP 2005122128 A 5/2005
KR 1020090084212 A 8/2009
(Continued)

OTHER PUBLICATIONS

ISR issued in Int'l. Application No. PCT/KR2018/002075, dated May 14, 2018.

*Primary Examiner* — Gerald Gauthier
(74) *Attorney, Agent, or Firm* — Greer Burns & Crain Ltd.

(57) ABSTRACT

A method and a system for multimodal interaction with a sound device connected to a network are provided. The method for multimodal interaction comprises the steps of: outputting audio information for playing content through a voice-based interface included in an electronic device; receiving a speaker's voice input associated with the outputted audio information through the voice-based interface; generating location information associated with the speaker's voice input; and determining an operation associated with the playing of the content by using the voice input and the location information associated with the voice input.

18 Claims, 10 Drawing Sheets

(51) Int. Cl.
*G10L 15/30* (2013.01)
*G10L 25/90* (2013.01)
*H04R 1/40* (2006.01)
*H04R 3/00* (2006.01)

(52) U.S. Cl.
CPC ............ *H04R 1/406* (2013.01); *H04R 3/005* (2013.01); *G10L 2015/223* (2013.01)

(58) Field of Classification Search
CPC ..... G10L 15/1815; G10L 15/22; G10L 15/26; G10L 15/30; G10L 25/90; G10L 2015/223; G10L 15/01; G10L 25/54; H04R 1/406; H04R 3/005; H04L 41/069
USPC ......... 379/88.14; 455/412.1, 414.1; 704/235, 704/251, 270, 252, 255, 270.1, 275; 709/217; 340/10.4; 600/586; 715/823
See application file for complete search history.

(56) References Cited

U.S. PATENT DOCUMENTS

| | | | | |
|---|---|---|---|---|
| 7,676,371 | B2* | 3/2010 | Cross, Jr. | G10L 15/22 704/270.1 |
| 7,827,033 | B2* | 11/2010 | Ativanichayaphong | H04M 3/4938 704/255 |
| 8,326,634 | B2* | 12/2012 | Di Cristo | G10L 15/1822 704/270.1 |
| 8,326,637 | B2* | 12/2012 | Baldwin | G10L 15/24 704/275 |
| 8,589,161 | B2* | 11/2013 | Kennewick | G10L 15/22 704/252 |
| 8,670,987 | B2* | 3/2014 | Bergl | G06F 3/167 704/275 |
| 8,862,475 | B2* | 10/2014 | Ativanichayaphong | G10L 15/26 704/270.1 |
| 8,938,392 | B2* | 1/2015 | Cross, Jr. | G10L 15/24 704/270 |
| 9,031,845 | B2* | 5/2015 | Kennewick | G06F 16/3329 704/270 |
| 9,484,030 | B1* | 11/2016 | Meaney | H04R 3/005 |
| 9,769,314 | B2* | 9/2017 | Kurganov | G10L 15/22 |
| 9,858,927 | B2* | 1/2018 | Williams | G10L 13/02 |
| 9,898,250 | B1* | 2/2018 | Williams | G06F 3/165 |
| 9,972,318 | B1* | 5/2018 | Kelly | G10L 15/22 |
| 10,032,451 | B1* | 7/2018 | Mamkina | G10L 15/26 |
| 10,140,973 | B1* | 11/2018 | Dalmia | G06F 40/247 |
| 10,170,116 | B1* | 1/2019 | Kelly | G06F 3/167 |
| 10,276,149 | B1* | 4/2019 | Liang | G10L 13/033 |
| 10,491,458 | B2* | 11/2019 | Seibert | H04L 63/1425 |
| 10,600,408 | B1* | 3/2020 | Smith | G10L 13/033 |
| 10,678,504 | B1* | 6/2020 | Kelly | G06F 3/167 |
| 2003/0064709 | A1* | 4/2003 | Gailey | G10L 15/22 455/412.1 |
| 2003/0064716 | A1* | 4/2003 | Gailey | G10L 15/22 455/414.1 |
| 2004/0166832 | A1* | 8/2004 | Portman | G10L 15/30 455/412.1 |
| 2006/0168095 | A1* | 7/2006 | Sharma | H04M 3/493 709/217 |
| 2008/0065386 | A1* | 3/2008 | Cross | G06F 3/0484 704/270 |
| 2010/0042413 | A1* | 2/2010 | Simpson | H04M 3/4938 704/270 |
| 2010/0225450 | A1* | 9/2010 | Fischer | G06Q 10/06 340/10.4 |
| 2015/0073306 | A1* | 3/2015 | Abeyratne | A61B 5/742 600/586 |
| 2016/0028878 | A1* | 1/2016 | Davis | G06F 3/167 704/275 |
| 2016/0379638 | A1* | 12/2016 | Basye | G10L 15/18 704/235 |
| 2018/0039477 | A1* | 2/2018 | Sung | G06F 3/04842 |
| 2018/0039478 | A1* | 2/2018 | Sung | G06F 3/167 |
| 2018/0190277 | A1* | 7/2018 | Bhaya | G10L 15/1822 |
| 2020/0043491 | A1* | 2/2020 | Lee | G06F 3/167 |

FOREIGN PATENT DOCUMENTS

| | | |
|---|---|---|
| KR | 1020110027362 A | 3/2011 |
| KR | 1020110139797 A | 12/2011 |
| KR | 1020130111234 A | 10/2013 |
| KR | 1020150136312 A | 12/2015 |
| KR | 1020170048304 A | 5/2017 |

* cited by examiner

METHOD AND SYSTEM FOR MULTIMODAL INTERACTION WITH SOUND DEVICE CONNECTED TO NETWORK

CROSS-REFERENCE TO RELATED APPLICATIONS

This is a continuation application of International Application No. PCT/KR2018/002075, filed Feb. 20, 2018, which claims benefit of Korean Patent Application No. 10-2017-0048304, filed Apr. 14, 2017.

BACKGROUND OF THE INVENTION

Field of Invention

Example embodiments of the present invention relate to a method and system for multimodal interaction with a sound device connected to a network, a computer program stored in a non-transitory computer-readable storage medium to implement a multimodal interaction method on a computer in conjunction with the computer, and the non-transitory computer-readable storage medium.

Description of Related Art

In general, a conventional behavior of consuming content or a service is performed based on a display. For example, a user receives information through a screen and interacts with the content or the service displayed on the screen through a manipulation on a controller and/or a recognition of a voice command. Even in the conventional behavior of consuming the content or the service, an interaction occurs through output of an audio or recognition of the voice command. However, the interaction occurring through output of the audio or recognition of the voice command is merely used for a secondary method for further richer experiences of display-based content and services.

By comparison, an interface operating based on voice, such as an artificial intelligence (AI) speaker of a home network service, is incapable of using visual information. Therefore, compared to the display-based content and/or service, the interaction between the voice-based content and/or the service and the user is not easy. For example, Korean Patent Laid-Open Publication No. 10-2011-0139797 relates to technology for a home media device and a home network system and method using the same and accordingly, describes technology that provides a home network service using a second communication network such as wireless fidelity (WiFi) in addition to a mobile communication network in the home network service and enables a user to perform a multiple-control on a plurality of home multimedia devices through a voice command without separately manipulating a button. For example, it may be assumed that, in the home network service, an electronic device configured to receive a voice command of a user receives a voice input "Turn off light" of the user. In this case, the electronic device may analyze the received voice input "Turn off light" and power OFF a smart lighting device. Alternatively, it may be assumed that the electronic device receives a voice input "Today weather" of the user. In this case, the electronic device may receive information about today's weather from an external server in response to the received voice input "Today weather", may synthesize the received information with a corresponding voice, and may output the synthesized voice through a speaker. However, such processing of a simple voice command and an operation according to the voice command has an advantage in that it is possible to provide the user with experiences capable of easily controlling in-house devices and easily acquiring information and, on the contrary, has a disadvantage in that it is difficult to provide the user with various experiences about content and/or service such as a display-based consumption behavior.

BRIEF SUMMARY OF THE INVENTION

A display-based interaction for content or a service needs to proceed in association with a predetermined orientation in which a user is present toward a display or a location limited by the display. Therefore, the orientation, the location, and the movement of the user are limited. For example, it is difficult for the user to use the content or the service at a location at which the user cannot view the display.

On the contrary, in a voice-based interaction, the user or utterer who utters voice input uses not visual information but auditory information. Therefore, the orientation, the location, and the movement of the utterer are relatively free. For example, although the utterer moves from the front of a sound device to the rear of the sound device, the user may readily use the content or the service based on the auditory information.

Using the aforementioned advantages, example embodiments of the present invention provide a multimodal interaction method and system that may provide various user experiences through a voice-based interface by using a command acquired through a voice input received from an utterer and location information (e.g., at least one of a relative location or orientation of the utterer relative to an electronic device that is measured at a point in time or during a period of time associated with reception of the voice input, whether the relative location or orientation is changed, a level of change in the relative location or orientation, and an orientation in which the relative location or orientation is changed) of the utterer associated with the voice input in an interaction through an electronic device connected to a network and operating based on a voice, a computer program stored in a non-transitory computer-readable storage medium to implement the multimodal interaction method on a computer in conjunction with the computer, and the non-transitory computer-readable storage medium.

Also, example embodiments provide a multimodal interaction method and system that may forward a command to an electronic device by collectively using a tone or a pitch of sound acquired through a voice input and a value (a location of a hand as explicit information of an utterer or a pulse, a daily travel amount, sleeping hours of a previous day, etc., as inexplicit information of the utterer) that is acquired from a peripheral device (e.g., a smartphone, a smart watch, a smart band, etc., of a user) interacting with the electronic device or may use the same as a source of content and/or a service, a computer program stored in a non-transitory computer-readable storage medium to implement the multimodal interaction method on a computer in conjunction with the computer, and the non-transitory computer-readable storage medium.

According to an aspect of at least one example embodiment, there is provided a multimodal interaction method of a multimodal interaction system, the multimodal interaction method including outputting audio information for playing content through a voice-based interface included in an electronic device; receiving a voice input of an utterer associated with the output audio information through the voice-based interface; generating location information associated with the voice input of the utterer; and determining an operation associated with the playing of the content based on the voice input and the location information associated with the voice input.

According to an aspect of at least one example embodiment, there is provided a non-transitory computer-readable storage medium storing a computer program to implement the multimodal interaction method on a computer.

According to an aspect of at least one example embodiment, there is provided a computer-program stored in the non-transitory computer-readable storage medium to implement the multimodal interaction method on a computer in conjunction with the computer.

According to an aspect of at least one example embodiment, there is provided a multimodal interaction system including a voice-based interface; and at least one processor configured to execute a computer-readable instruction. The at least one processor is configured to output audio information for playing content through the voice-based interface, receive a voice input of an utterer associated with the output audio information through the voice-based interface, generate location information associated with the voice input of the utterer, and determine an operation associated with the playing of the content based on the voice input and the location information associated with the voice input.

According to some example embodiments, it is possible to provide various user experiences through a voice-based interface by using a command acquired through a voice input received from an utterer and location information (e.g., at least one of a relative location or orientation of the utterer relative to an electronic device that is measured at a point in time or during a period of time associated with reception of the voice input, whether the relative location or orientation is changed, a level of change in the relative location or orientation, and an orientation in which the relative location or orientation is changed) of the utterer associated with the voice input in an interaction through an electronic device connected to a network and operating based on a voice.

Also, according to some example embodiments, it is possible to forward a command to an electronic device by collectively using a tone or pitch of sound acquired through a voice input and a value (a location of a hand as explicit information of an utterer or a pulse, a daily travel amount, sleeping hours of a previous day, etc., as inexplicit information of the utterer) that is acquired from a peripheral device (e.g., a smartphone, a smart watch, a smart band, etc., of a user) interacting with the electronic device or to use the same as a source of content and/or a service.

DETAILED DESCRIPTION OF THE INVENTION

Hereinafter, example embodiments will be described with reference to the accompanying drawings.

A multimodal interaction system according to example embodiments may be configured through an electronic device providing an interface that operates based on voice. The electronic device may output audio information to provide audio-based content to a user, and may acquire a voice input as the user or utterer utters in response to the output audio information. The electronic device may process a user command by recognizing and analyzing the acquired voice input directly or through an external platform that is connected through a separate interface connector, and may play audio-based content. Here, the electronic device may determine an operation associated with playing of the content by further using location information associated with the voice input of the utterer as well as the voice input of the utterer.

A multimodal interaction method according to example embodiments may be performed through the aforementioned electronic device. Here, a computer program according to an example embodiment may be installed and executed on the electronic device, and the electronic device may perform the multimodal interaction method under control of the executed computer program. The aforementioned computer program may be stored in a non-transitory computer-readable storage medium to implement the multimodal interaction method on a computer in conjunction with the electronic device configured as the computer.

Figure 1:
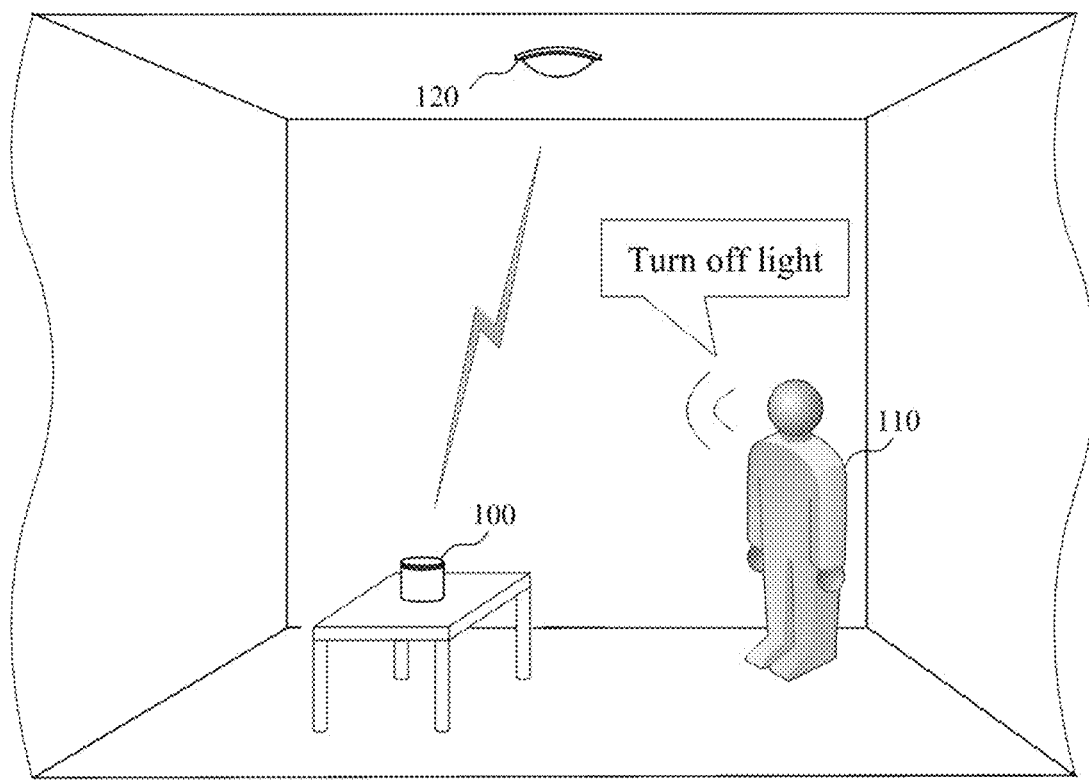
FIG. 1 illustrates an example of a service environment using a voice-based interface according to an example embodiment.

FIG. 1 illustrates an example of a service environment using a voice-based interface according to an example embodiment. The example embodiment of FIG. 1 represents an example in which an electronic device 100 providing an interface that operates based on voice recognizes and analyzes a voice input "Turn off light" received in response to an utterance of a user 110 and controls the power of an in-house lighting device 120 connected to the electronic device 100 through an internal network in technology for connecting and controlling in-house devices, such as a smart home or a home network service.

For example, in-house devices may include various devices connectable and controllable online, for example, home appliances such as a television (TV), a personal computer (PC), a computer peripheral device, an air conditioner, a refrigerator, and a robot cleaner, energy consumption devices such as a water supply, an electricity, an air-conditioning and heating device, a door lock, and a security device such as a surveillance camera, in addition to the aforementioned in-house lighting device 120. Also, the internal network may employ wired network technology, for example, Ethernet, HomePNA, and Institute of Electrical and Electronics Engineers (IEEE) 1394, and wireless network technology such as Bluetooth, ultra wideband (UWB), ZigBee, wireless 1394, and a home radio frequency (RF).

The electronic device 100 may be one of in-house devices. For example, the electronic device 100 may be one of devices such as an AI speaker or a robot cleaner provided in a house. Also, the electronic device 100 may be a mobile device of the user 110, for example, a smartphone, a mobile phone, a laptop computer, a digital broadcasting terminal, a personal digital assistant (PDA), a portable multimedia player (PMP), and a tablet PC. As described above, any type of devices including a function connectable to in-house devices to receive a voice input of the user 110 and to control the in-house devices may be used for the electronic device 100 without being particularly limited.

Figure 2:
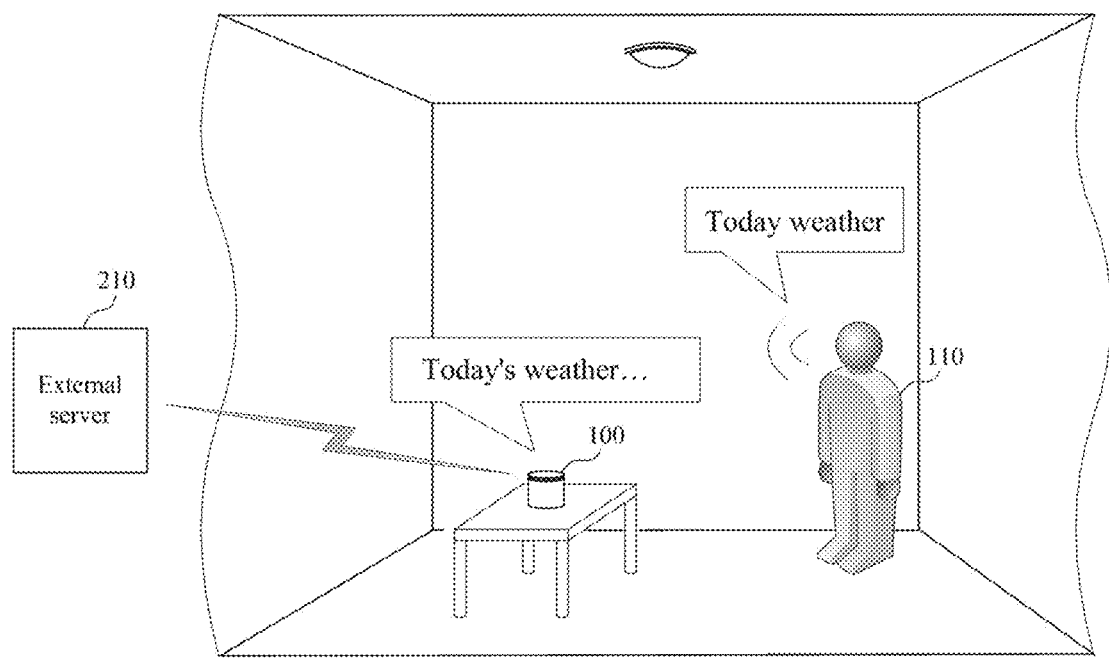
FIG. 2 illustrates another example of a service environment using a voice-based interface according to an example embodiment.

FIG. 2 illustrates another example of a service environment using a voice-based interface according to an example embodiment. The example embodiment of FIG. 2 represents an example in which the electronic device 100 providing an interface that operates based on voice recognizes and analyzes a voice input "Today's weather" received in response to an utterance of the user 110, acquires information about today's weather from an external server 210 over an external network, and outputs the acquired information using voice.

For example, the external network may include at least one of network topologies that include a personal area network (PAN), a local area network (LAN), a campus area network (CAN), a metropolitan area network (MAN), a wide area network (WAN), a broadband network (BBN), and the Internet.

In the example embodiment of FIG. 2, the electronic device 100 may be one of in-house devices or one of mobile devices of the user 110. Any type of devices including a function for receiving and processing a voice input of the user 110 and a function for connecting to the external server 210 and providing content or a service provided from the external server 210 to the user 110 may be used for the electronic device 100 without being particularly limited.

As described above, without any particular limitation, the electronic device 100 according to example embodiments may be any device capable of processing a user command at least including a voice input received in response to an utterance of the user 110 through a voice-based interface. For example, the electronic device 100 may directly process the user command by recognizing and analyzing the voice input of the user 110 and by performing an operation suitable for the voice input. Depending on example embodiments, processing such as recognition of the voice input of the user 110, analysis of the recognized voice input, and synthesis of voice to be provided to the user 110 may be performed through an external platform linked to the electronic device 100.

Figure 3:
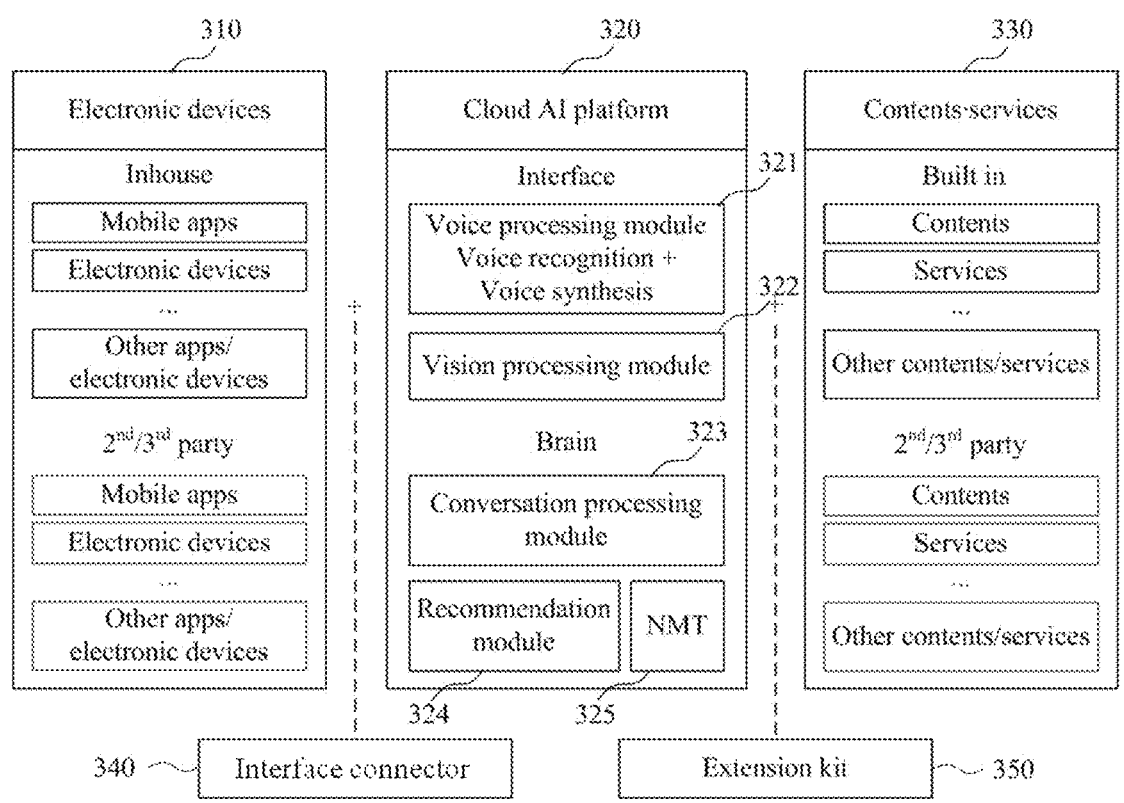
FIG. 3 illustrates an example of a cloud artificial intelligence (AI) platform according to an example embodiment.

FIG. 3 illustrates an example of a cloud artificial intelligence (AI) platform according to an example embodiment. FIG. 3 illustrates electronic devices 310, a cloud AI platform 320, and a content/service 330.

For example, the electronic devices 310 may indicate devices provided in a house, and may at least include the aforementioned electronic device 100. The electronic devices 310 or applications (hereinafter, apps) installed and executed on the electronic devices 310 may be linked to the cloud AI platform 320 through an interface connector 340. Here, the interface connector 340 may provide developers with a software development kit (SDK) and/or development documents for developing the electronic devices 310 or apps installed and executed on the electronic devices 310. Also, the interface connector 340 may provide an application program interface (API) such that the electronic devices 310 or the apps installed and executed on the electronic devices 310 may use functions provided from the cloud AI platform 320. In detail, devices or apps developed by the developers using the SDK and/or development documents provided from the interface connector 340 may use functions provided from the cloud AI platform 320 using the API provided from the interface connector 340. The interface connector 340 may be included in the cloud AI platform 320 or a computer device that operates separately at a provider side of the cloud AI platform 320.

Here, the cloud AI platform 320 may provide a function for providing a voice-based service. For example, the cloud AI platform 320 may include various modules for providing a voice-based service, such as a voice processing module 321 configured to recognize a received voice and synthesize a voice to be output, a vision processing module 322 configured to analyze and process a received image or video, a chat processing module 323 configured to determine an appropriate chat to output a voice suitable for the received voice, a recommendation module 324 configured to recommend a function suitable for the received voice, and a neural machine translation (NMT) 325 configured to support AI to translate a language based on a sentence unit through data learning. The voice processing module 321, the vision processing module 322, the chat processing module 323, and the neural machine translation 325 may be representation of functions processed by at least one processor of at least one computer device implementing the cloud AI platform 320. Well-known techniques may be utilized for the functions for processing voice, vision, chat, and machine translation.

For example, in the example embodiments of FIGS. 1 and 2, the electronic device 100 may transmit a voice input of the user 110 to the cloud AI platform 320 using the API provided from the interface connector 340. In this case, the cloud AI platform 320 may recognize and analyze the received voice input through the aforementioned modules 321 through 325, and may synthesize and provide an appropriate answering voice or may recommend an appropriate operation in response to the received voice input.

Also, an expansion kit 350 may provide a development kit such that third party content developers or companies may configure a new voice-based function based on the cloud AI platform 320. The expansion kit 350 may be included in the cloud AI platform 320 or a computer device that operates separately at the third party content developers or companies.

For example, in the example embodiment of FIG. 2, the electronic device 100 may transmit the received voice input of the user 110 to the external server 210, and the external server 210 may transmit the voice input to the cloud AI platform 320 through the API provided through the expansion kit 350. In this case, similar to the aforementioned manner, the cloud AI platform 320 may recognize and analyze the received voice input and may synthesize and provide an appropriate answering voice or may provide the external server 210 with recommendation information about a function to be processed through the voice input. For example, referring to FIG. 2, the external server 210 may transmit the voice input "Today weather" to the cloud AI platform 320 and may receive, from the cloud AI platform 320, keywords "today" and "weather" that are extracted by recognizing the voice input "Today weather". In this case, the external server 210 may generate text information, such as "Today's weather . . . " using the keywords "today" and "weather" and may transmit again the generated text information to the cloud AI platform 320. Here, the cloud AI platform 320 may synthesize the text information with a voice and may provide the synthesized voice to the external server 210. The external server 210 may transmit the synthesized voice to the electronic device 100 and the electronic device 100 may output the synthesized sound "Today's weather . . . " through a speaker. In this manner, the voice input "today weather" received from the user 110 may be processed.

Here, the electronic device 100 may perform the multimodal interaction method according to example embodiments to provide the user with audio-based content provided from the external server 210.

Figure 4:
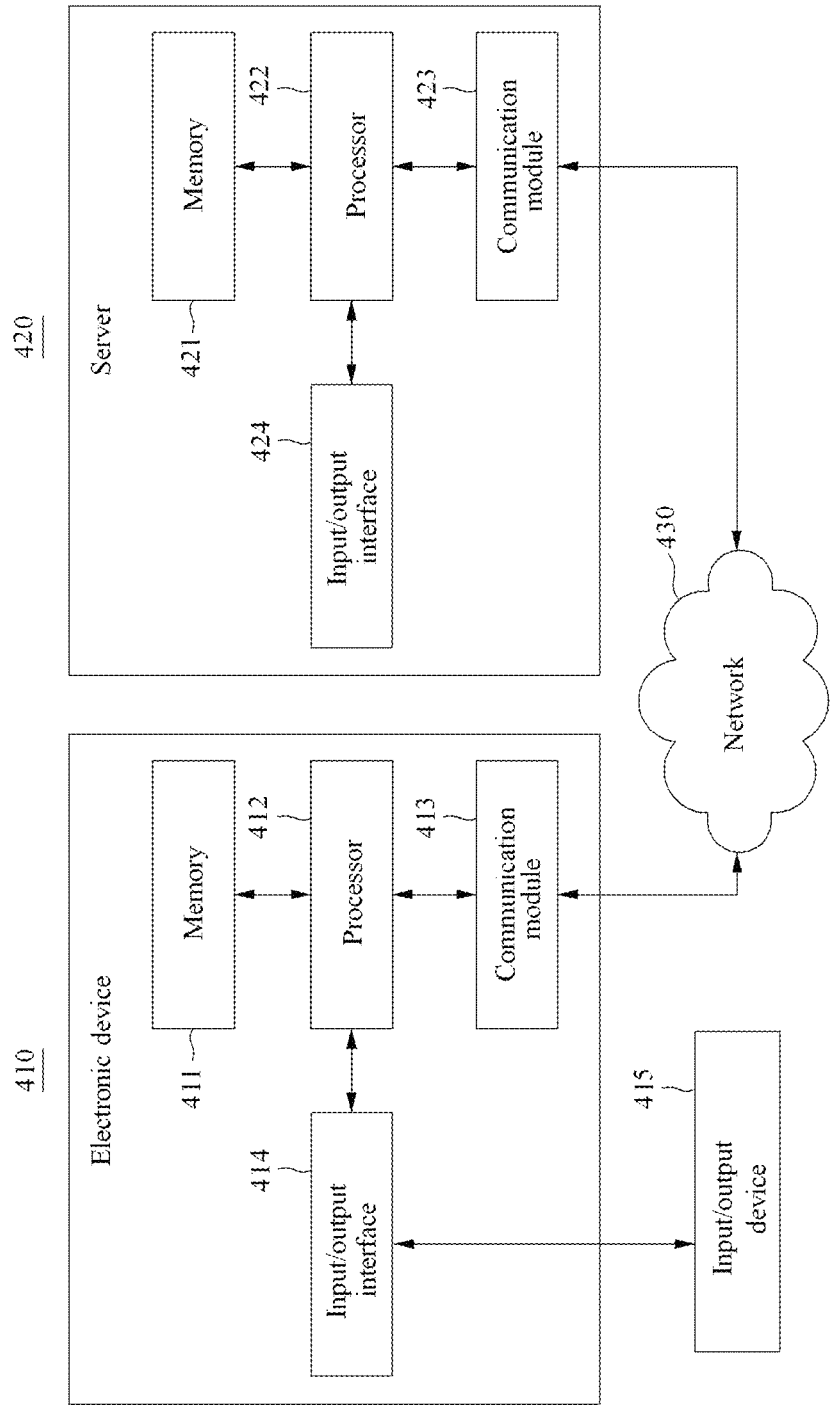
FIG. 4 is a block diagram illustrating a configuration of an electronic device and a server according to an example embodiment.

FIG. 4 is a block diagram illustrating an example of an electronic device and a server according to an example embodiment. An electronic device 410 of FIG. 4 may correspond to the aforementioned electronic device 100, and a server 420 may correspond to the aforementioned external server 210 or a single computer apparatus that configures the cloud AI platform 320.

Referring to FIG. 4, the electronic device 410 may include a memory 411, a processor 412, a communication module 413, and an input/output (I/O) interface 414, and the server 420 may include a memory 421, a processor 422, a communication module 423, and an I/O interface 424. The memories 411, 421 may include a permanent mass storage device, such as random access memory (RAM), a read only memory (ROM), and a disk drive, as a non-transitory computer-readable storage medium. The permanent mass storage device, such as ROM and disk drive, may be included in the electronic device 410 or the server 420 as a permanent storage device separate from the memories 411, 421. Also, an OS or at least one program code, for example, a code for an application installed and executed on the electronic device 410 to provide a specific service, may be stored in the memories 411, 421. Such software components may be loaded from another non-transitory computer-readable storage medium separate from the memories 411, 421. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memories 411, 421 through the communication modules 413, 423, instead of the non-transitory computer-readable storage medium. For example, at least one program may be loaded to the memory 411 of the electronic device 410 based on a computer program, for example, the application, installed by files provided over the network 430 from developers or a file distribution system providing an installation file of the application.

The processors 412, 422 may be configured to process instructions of a computer program by performing basic arithmetic operations, logic operations, and I/O operations. The computer-readable instructions may be provided from the memories 411, 421 or the communication modules 413, 423 to the processors 412, 422. For example, the processors 412, 422 may be configured to execute received instructions in response to the program code stored in the storage device, such as the memories 411, 421.

The communication modules 413, 423 may provide a function for communication between the electronic device 410 and the server 420 over the network 430 and may provide a function for communication between the electronic device 410 and/or the server 420 with another electronic device or another server. For example, the processor 412 of the electronic device 410 may transfer a request created based on a program code stored in the storage device such as the memory 411, to the server 420 over the network 430 under control of the communication module 413. Inversely, a control signal, an instruction, content, a file, etc., provided under control of the processor 422 of the server 420 may be received at the electronic device 410 through the communication module 413 of the electronic device 410 by going through the communication module 423 and the network 430. For example, a control signal, an instruction, content, a file, etc., of the server 420 received through the communication module 413 may be transferred to the processor 412 or the memory 411, and content, a file, etc., may be stored in a storage medium, for example, a permanent storage device, further includable in the electronic device 410.

The I/O interface 414 may be a device used for interfacing with an I/O device 415. For example, an input device of the I/O device 415 may include a device, such as a microphone, a keyboard, and a mouse, and an output device of the I/O device 415 may include a device, such as a display and a speaker. As another example, the I/O interface 414 may be a device for interfacing with an apparatus in which an input function and an output function are integrated into a single function, such as a touchscreen. The I/O device 415 may be configured as a single device with the electronic device 410. Also, the I/O interface 424 of the server 420 may be a device for interfacing with an apparatus (not shown) for input or output that may be connected to the server 420 or included in the server 420.

According to other example embodiments, the electronic device 410 and the server 420 may include a smaller or greater number of components than the number of components shown in FIG. 4. For example, the electronic device 410 may include at least a portion of the I/O apparatus 415, or may further include other components, for example, a transceiver, a global positioning system (GPS) module, a camera, a variety of sensors, a database (DB), and the like. In detail, if the electronic device 410 is a smartphone, the electronic device 410 may be configured to further include a variety of components, for example, an accelerometer sensor, a gyro sensor, a camera module, various physical buttons, a button using a touch panel, an I/O port, a vibrator for vibration, etc., which are generally included in the smartphone.

In the example embodiments, the electronic device 410 may basically include a microphone for receiving a voice input of the user as the I/O device 415, and may further include a speaker for outputting sound such as an answering voice or audio content corresponding to the voice input of the user as the I/O input device 415.

Here, the electronic device 410 may adjust an output volume of sound to be output in response to the voice input of the user based on an input volume of the voice input of the user. Here, the output volume may be proportional to the input volume. For example, the louder the user calls the electronic device 410, an output volume of sound to be output in response to a user command may be adjusted to relatively increase. Inversely, the softer the user calls the electronic device 410, the output volume of sound to be output in response to the user command may be adjusted to relatively decrease. In detail, the output volume of sound to be output may be adjusted to be identical to the input volume of the voice input. If the user calls the electronic device 410 in a low voice or a whispering voice, the electronic device 410 may also respond to call of the user in a low voice or a whispering voice.

Figure 5:
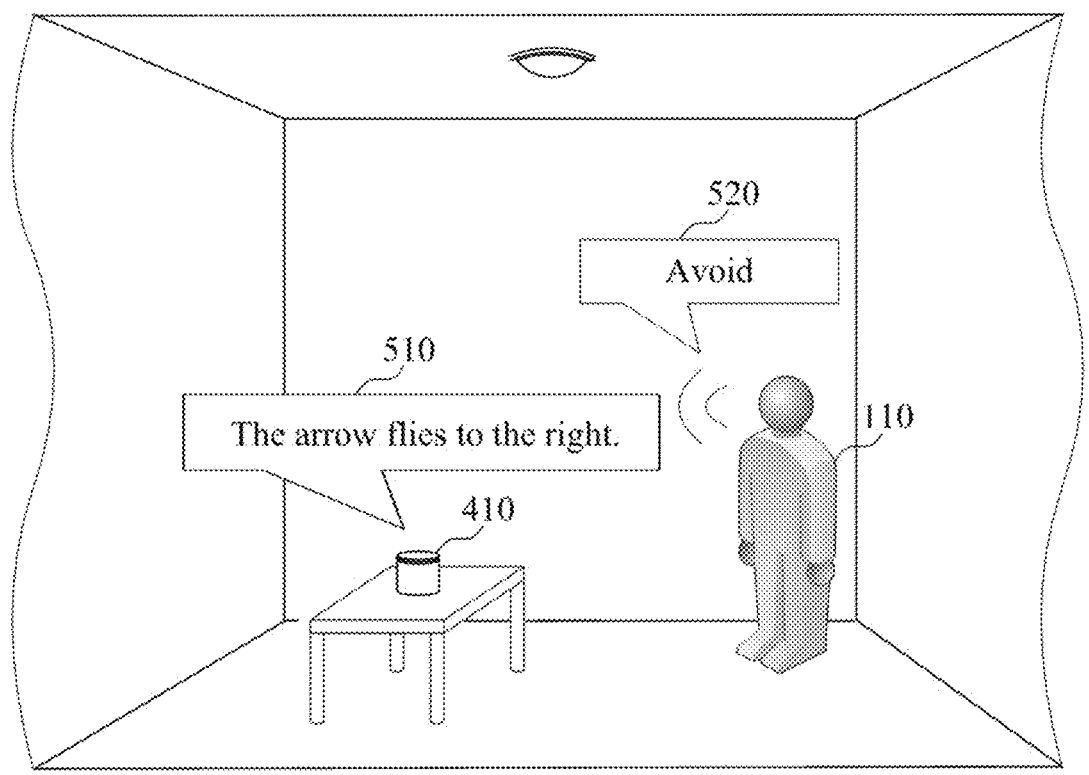
FIGS. 5 and 6 illustrate examples of location information associated with an utterance of an utterer according to an example embodiment.
Figure 6:
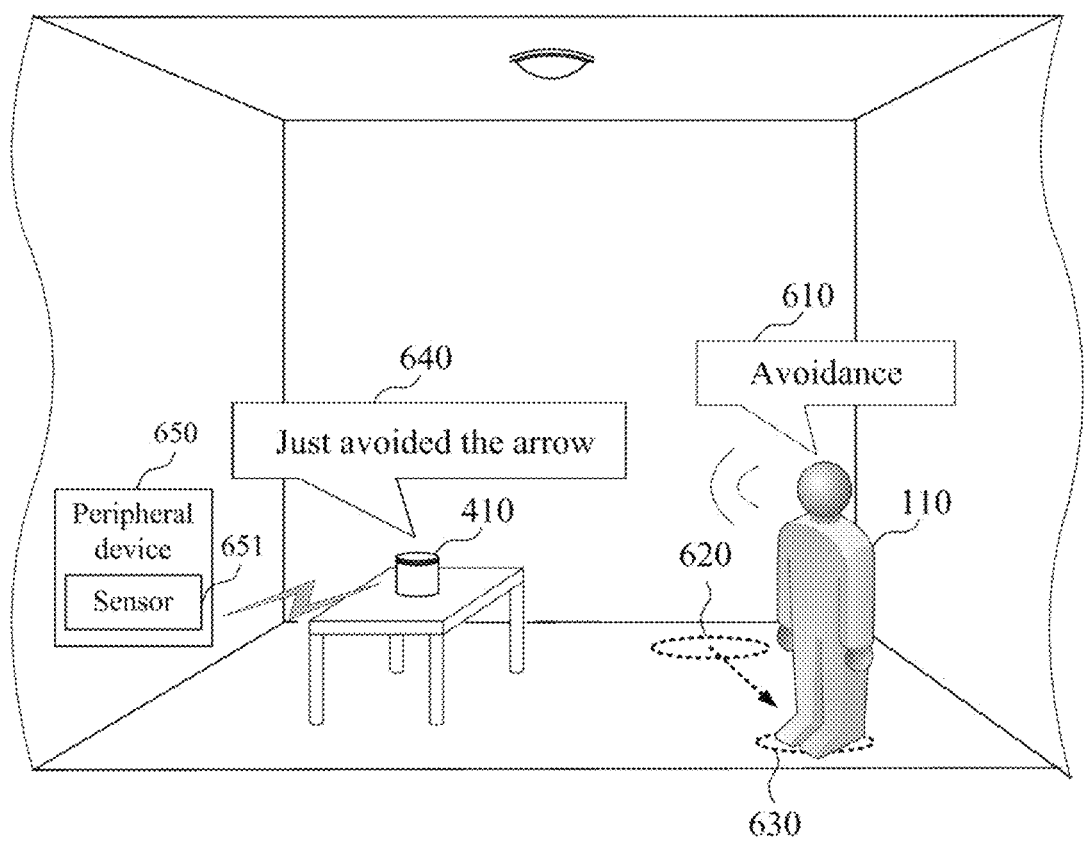

FIGS. 5 and 6 illustrate examples of location information associated with an utterance of an utterer according to an example embodiment. FIGS. 5 and 6 illustrate examples of providing audio-based game content through the electronic device 410 including a voice-based interface. FIG. 5 illustrates an example in which the electronic device 410 outputs "The arrow flies to the right" as illustrated in a first speech balloon 510 as audio information for playing of the game content. Here, FIGS. 5 and 6 illustrate an example in which the user 110 moves from a first location 620 to a second location 630 while uttering "Avoidance" as illustrated in a third speech balloon 610 of FIG. 6. Uttering "Avoid" as illustrated in a second speech balloon 520 of FIG. 5 may mean an intermediate state of the uttering "Avoidance" as illustrated in a third speech balloon 610. In this case, the electronic device 410 may determine an operation associated with playing of game content based on the voice input "avoidance" that is input through the utterance of the user 110 and location information of the user 110, that is, information associated with a movement of the user 110 from the first location 620 to the second location 630 while uttering the voice input "avoidance". For example, the electronic device 410 may determine that a virtual character of the game content has moved from the first location 620 to the second location 630 as an avoidance operation based on the received voice input and the location information of the user 110. Through this, whether an arrow is avoided in the game content may be determined. Also, for example, in FIG. 6, as the electronic device 410 determines that the virtual character of the game content corresponding to the user 110 has avoided the arrow, a synthesized voice "Just avoided the arrow" is output as a result according to the determined operation as illustrated in a fourth speech balloon 640.

Depending on example embodiments, a peripheral device 650 may be utilized to determine a location of the user 110. For example, the electronic device 410 may receive a measurement value that is measured by a sensor 651 included in the peripheral device 650 in association with the voice input "Avoidance". The peripheral device 650 may be a smartphone, a smart watch, and/or a smart band held or worn by the user 110. The sensor 651 may include a camera, a gyro sensor, a motion sensor, an acceleration sensor, and the like.

As described above, the example embodiments may provide an utterer with various interaction experiences and high content immersion by using location information of the utterer associated with the voice input, instead of simply playing content using only a command included in the voice input with respect to audio-based content. In particular, in existing visually provided content, a movement of a location and a change of orientation of a user are limited to occur on an area on which a display is visible. On the contrary, according to the example embodiments, the utterer may have a relatively high degree of freedom in moving a location and switching an orientation using not visible information but auditory information.

Figure 7:
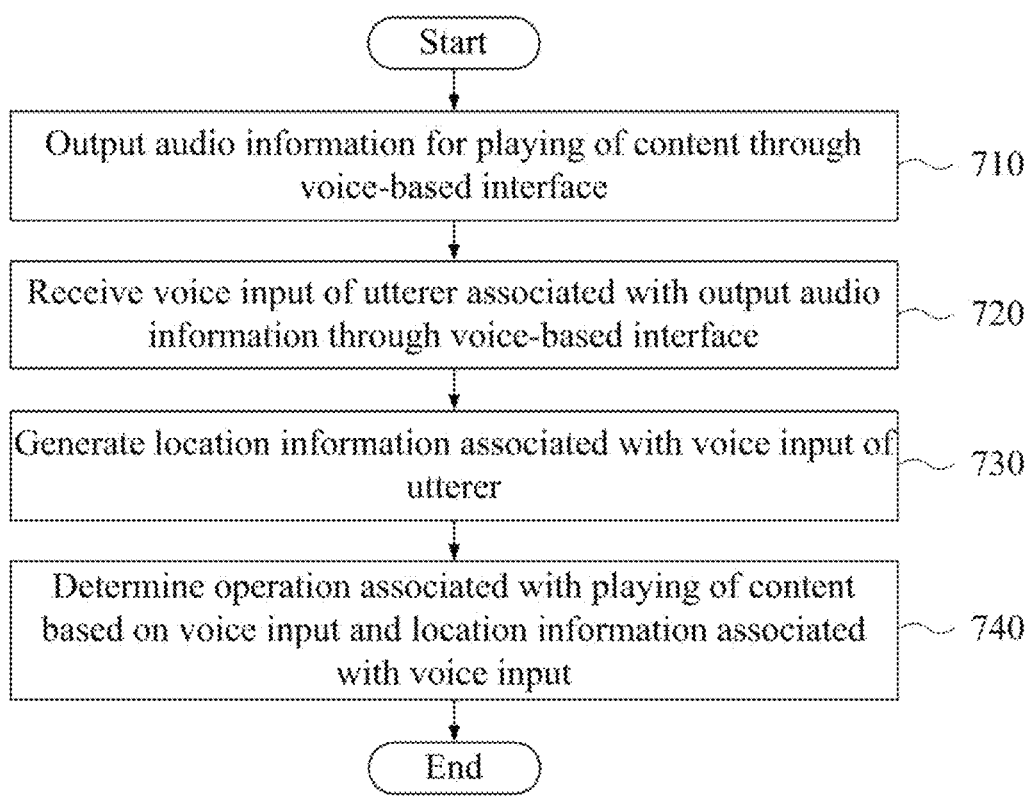
FIG. 7 is a flowchart illustrating an example of a multimodal interaction method performed by an electronic device according to an example embodiment.

FIG. 7 is a flowchart illustrating an example of a multimodal interaction method performed by an electronic device according to an example embodiment. A multimodal interaction system according to the example embodiments may be configured in a form of a computer apparatus such as the aforementioned electronic device 410. The electronic device 410 may perform operations 710 to 740 included in the multimodal interaction method of FIG. 7. Here, the processor 412 may be configured to execute a control instruction according to a code of at least one program or a code of an OS included in the memory 411. Here, the processor 412 may control the electronic device 410 to perform operations 710 to 740 of FIG. 7 in response to a control instruction provided from the code stored in the electronic device 410.

In operation 710, the electronic device 410 may output audio information for playing content through a voice-based interface. The voice-based interface may basically include an output module for outputting synthesized voice information and an input module for receiving an utterance of an utterer. The content may be basically played through interaction with the utterer using the voice-based interface.

In operation 720, the electronic device 410 may receive a voice input of the utterer associated with the output audio information through the voice-based interface. Technology for receiving the voice input of the utterer may be easily understood by one skilled in the art through known arts.

In operation 730, the electronic device 410 may generate location information associated with the voice input of the utterer. Here, the location information associated with the voice input may include at least one of a relative location or orientation of the utterer relative to the electronic device 410 that is measured at a point in time or during a period of time associated with reception of the voice input, whether the relative location or orientation is changed, a level of change in the relative location or orientation, and an orientation in which the relative location or orientation is changed.

For example, the electronic device 410 may generate the location information associated with the voice input based on a phase shift of the voice input that is input through a plurality of microphones included in the voice-based interface. Technology for measuring an originating location of a sound signal using a phase shift of the same sound signal input through the plurality of microphones may be easily understood by one skilled in the art through the known art, for example, beamforming technology. In this case, since the location information is measured based on the voice input of the utterer, the utterer does not need to face a specific orientation. Within the distance in which the utterance of the utterer is recognizable, the location of the utterer may not be limited. Also, without a need to add a separate apparatus to the electronic device 410 aside from the voice-based interface, location information of the utterer may be acquired.

Depending on example embodiments, it may be assumed that the electronic device 410 includes additional equipment, for example, a camera or a sensor, to acquire location information of the utterer. Also, all of location information of the utterer measured through the voice-based interface and location information of the utterer measured using the additional equipment such as a camera or a sensor may be used. In the case of using the camera and/or the sensor, the electronic device 410 may generate location information associated with the voice input based on an output value of the camera and/or the sensor. The sensor may be used without limitation as long as it can be a sensor that may help to obtain the user's location information, such as a gyro sensor, a motion sensor, an acceleration sensor, and the like.

In operation 740, the electronic device 410 may determine an operation associated with playing of the content based on the voice input and location information associated with the voice input. That the operation associated with playing of the content may be set to various forms based on content may be easily understood by one skilled in the art. For example, the operation may be determined using one of all of available operations based on a type or a characteristic content, a progress state of content, etc., such as an operation of the electronic device 410, an operation of a peripheral device interacting with the electronic device 410, an operation of an external server, for example, the external server

210 of FIG. 2, providing content through the electronic device 410 by interacting with the electronic device 410 over the network, an operation required to the utterer in association with playing of the content, and an operation of a virtual character or a virtual object on the content. As an example of the operation, an example of determining an operation associated with avoidance of the arrow shot to the virtual character in the game content is described with reference to FIGS. 5 and 6. As another example, an operation of adjusting an output volume of the electronic device 410 to increase or decrease may be determined based on location information about a voice input "volume" of the utterer and a movement of the utterer to the left or right in association with the voice input in response to output audio information "Would you like to adjust the volume". As another example, the audio information may include information that requires an utterance of the utterer and a change in a location of the utterer. In this case, in operation 740, the electronic device 410 may determine the operation associated with the playing of the content depending on whether the received voice input and location information associated with the received voice input meet a condition preset in correspondence to the required information. In detail, for example, the electronic device 410 may output audio information "Move three steps to the left" and may determine an operation associated with playing of content depending on whether the utterer has substantially moved three steps to the left based on location information associated with the voice input of the utterer.

Once the operation is determined, a process of performing the determined operation may be performed. For example, when the operation of the electronic device 410 is determined, the electronic device 410 may perform the determined operation. As another example, when the operation for requesting the utterer is determined, the electronic device 410 may synthesize a voice for requesting the utterer for the determined operation and may output the synthesized voice through the voice-based interface. As another example, when the electronic device 410 directly controls an operation of a virtual character or a virtual object in content or when the external server provides content, the electronic device 410 may transmit information for controlling the operation of the virtual character or the virtual object to the external server such that the external server may control the operation of the virtual character or the virtual object.

In another example embodiment, an interaction between the utterer and the electronic device 410 providing content through the voice-based interface may be performed using various methods. For example, an instruction recognized from the voice input, a tone and/or pitch of sound corresponding to the voice input, or a value acquired from a peripheral device interacting with the electronic device 410 may be further used to determine the operation associated with playing of the content.

For example, in operation 740, the electronic device 410 may determine the operation associated with the playing of the content by integrating at least one of a tone of sound corresponding to the voice input, a pitch of the sound, and a command extracted by analyzing the voice input, and location information associated with voice input. In detail, in game content of hitting a virtual target by throwing a virtual object, the command extracted from the voice input may be used to inform a start point in time of throwing a virtual object, a travel distance of the utterer may be used to determine a force of throwing an object, and the tone of sound or the pitch of sound corresponding to the voice input may be used to determine an angle of throwing an object.

As another example, the electronic device 410 may determine the operation associated with playing of content by further using a value acquired from the peripheral device interacting with the electronic device 410.

Figure 8:
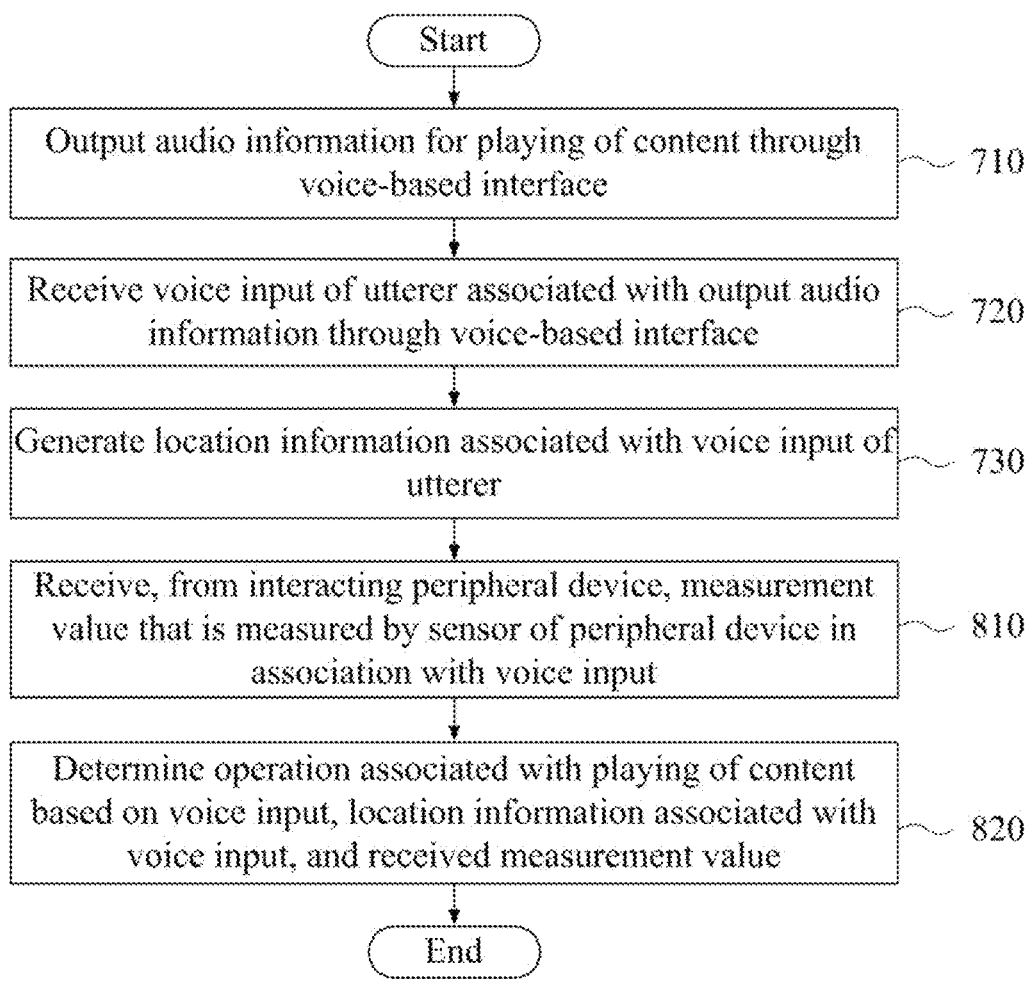
FIG. 8 is a flowchart illustrating an example of a multimodal interaction method using an output value measured through a sensor of a peripheral device according to an example embodiment.

FIG. 8 is a flowchart illustrating an example of a multimodal interaction method using an output value measured through a sensor of a peripheral device according to an example embodiment. Operations of 810 and 820 of FIG. 8 may be performed instead of performing operation 740 of FIG. 7.

In operation 810, the electronic device 410 may receive, from the interacting peripheral device, a measurement value that is measured by a sensor of the peripheral device in association with the voice input. Here, the measurement value that is measured in association with the voice input may include a measurement value that is measured by the sensor of the peripheral device at a point in time or during a period of time associated with reception of the voice input. In detail, the electronic device 410 may interact with the peripheral device, for example, a smartphone, a smart watch, and a smart band held or worn by the utterer, and may include a measurement value that is measured by the sensor of the peripheral device at a point in time at which the electronic device 410 receives the voice input or during a period of time in which the voice input is received in response to utterance of the utterer.

In operation 820, the electronic device 410 may determine the operation associated with playing of the content based on the voice input, location information associated with the voice input, and the received measurement value. For example, when the utterer raises a hand holding a smartphone during an utterance, a motion of the hand of the utterer may be measured using a measurement value of an accelerometer sensor or a gyroscope sensor included in the smartphone in response to the motion of the hand. In this case, the electronic device 410 may measure the motion of the hand of the utterer based on the received measurement value and may determine the operation associated with the playing of the content by further using the measured motion of the hand. In detail, for example, a difference operation may be determined in association with playing of the content in each of a case in which the utterer simply moves at a time of making an utterance and a case in which the utterer moves while raising and waving the hand. As another example, a pulse of the utterer measured in association with the voice input may be used to determine the operation associated with playing of content. Also, when a plurality of utterers is present, the measurement value may be used to select a specific utterer, for example, an utterer raising a hand first among the plurality of utterers shouting a correct answer in quiz content.

Depending on example embodiments, the operation associated with playing of the content may be determined based on at least two of a command extracted from a voice input, a tone of sound corresponding to the voice input, a pitch of the sound, and a measurement value measured through a sensor of a peripheral device instead of using location information of the utterer. For example, in a basketball game, an operation of throwing a basketball may be determined based on a command "shoot" of a voice input, an angle of throwing the basketball may be determined based on a tone of sound corresponding to "shoot", and a force of throwing the basketball may be determined based on a pitch of sound corresponding to "shoot". As described above, a multimodal interaction between content and an utterer may be determined based on the command extracted from the voice input through the voice-based interface and other various information.

Figure 9:
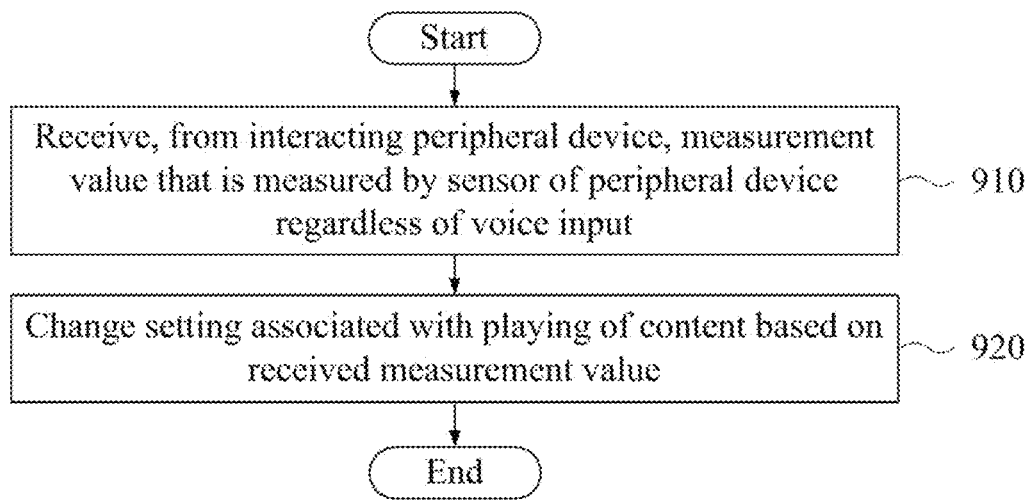
FIG. 9 is a flowchart illustrating another example of a multimodal interaction method using an output value measured through a sensor of a peripheral device according to an example embodiment.

FIG. 9 is a flowchart illustrating another example of a multimodal interaction method using an output value measured through a sensor of a peripheral device according to an example embodiment. Operations 910 and 920 of FIG. 9 may be performed before or after operations 710 to 740 of FIG. 7, or may be performed between operations 710 to 740 of FIG. 7.

In operation 910, the electronic device 410 may receive, from an interacting peripheral device, a measurement value that is measured by a sensor of the interacting peripheral device regardless of a voice input. For example, the measurement value may use various values that are specifiable through the sensor, for example, a pulse of a user, a travel amount during a predetermined period of time, and sleeping hours of a previous day.

In operation 920, the electronic device 410 may change a setting associated with playing of content based on the received measurement value. For example, in game content, a power level, such as physical strength or force of a virtual character of a present day may be adjusted based on sleeping hours or a travel amount of a previous day of the utterer. Alternatively, a setting may be changed such that the power level of the virtual character may gradually increase based on the accumulated travel amount of the utterer. As described above, one skilled in the art may easily understand that a type of the measurement value or a type of a setting associated with playing of content may be variously used based on a characteristic or a type of the content.

Figure 10:
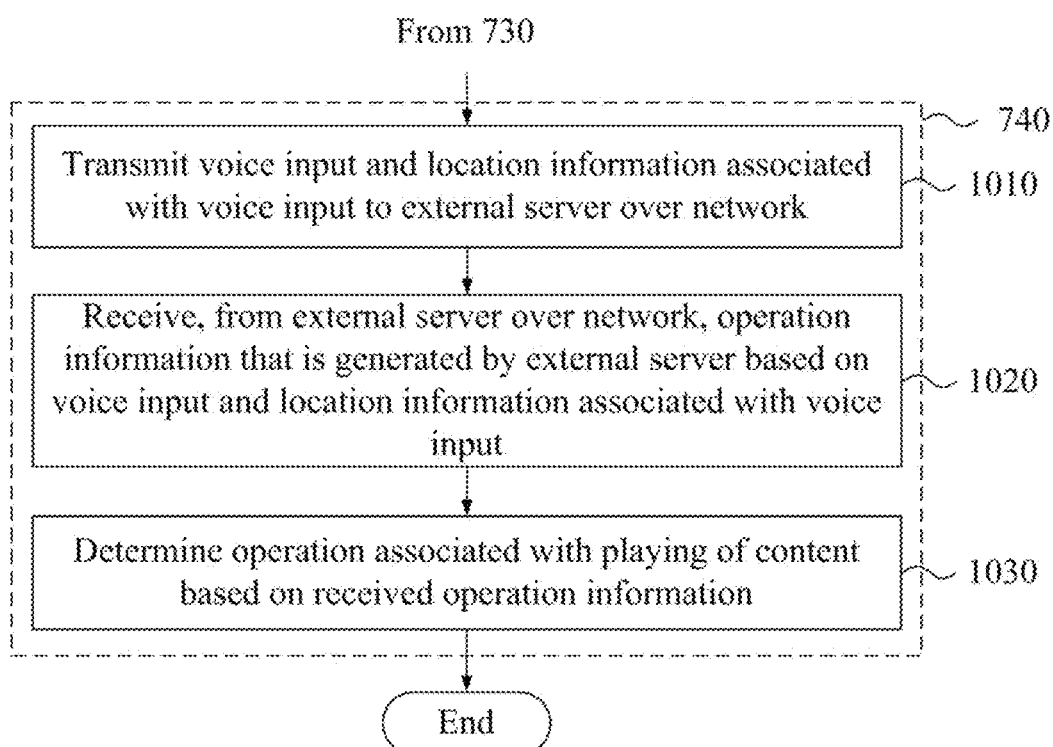
FIG. 10 is a flowchart illustrating an example of a multimodal interaction method in the case of providing content through an external server according to an example embodiment.

FIG. 10 is a flowchart illustrating an example of a multimodal interaction method in the case of providing content through an external server according to an example embodiment. Operations 1010 to 1030 of FIG. 10 may be included in operation 740 of FIG. 7 and thereby performed.

In operation 1010, the electronic device 410 may transmit the voice input and location information associated with the voice input to the external server over a network. Here, the external server may correspond to the external server 210 of FIG. 2 and may be an apparatus that provides content through communication with the electronic device 410 over the network.

In operation 1020, the electronic device 410 may receive, from the external server over the network, operation information that is generated by the external server based on the voice input and the location information associated with the voice input. Instead of directly analyzing the voice input and the location information, the electronic device 410 may transmit the voice input and the location information to the external server such that the external server may generate operation information based on the transmitted information and then may receive a result thereof.

In operation 1030, the electronic device 410 may determine the operation associated with playing of the content based on the received operation information. Substantially, operation 1030 may be a process in which the external server determines the operation associated with playing of the content, receives information related thereto, and verifies the determined operation.

As described above, according to some example embodiments, it is possible to provide various user experiences through a voice-based interface by using a command acquired through a voice input received from an utterer and location information (e.g., at least one of a relative location or orientation of the utterer relative to the electronic device that is measured at a point in time or during a period of time associated with reception of the voice input, whether the relative location or orientation is changed, a level of change in the relative location or orientation, and an orientation in which the relative location or orientation is changed) of the utterer associated with the voice input in an interaction through an electronic device connected to a network and operating based on a voice. Also, according to some example embodiments, it is possible to forward a command to an electronic device by collectively using a tone or a pitch of sound acquired through a voice input and a value (a location of a hand as explicit information of an utterer or a pulse, a daily travel amount, sleeping hours of a previous day, etc., as inexplicit information of the utterer) that is acquired from a peripheral device (e.g., a smartphone, a smart watch, a smart band, etc., of a user) interacting with the electronic device or to use the same as a source of content and/or a service.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable storage media including program instructions to implement various operations of the above-described example embodiments. The media may also include, alone or in combination with the program instructions, data files, data structures, and the like. The media may continuously store a program executable by a computer or may temporarily store the program for execution or download. Also, the media may be various types of recording devices or storage devices in which a single piece or a plurality of pieces of hardware may be distributed over a network without being limited to a medium directly connected to a computer system. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A multimodal interaction method of a multimodal interaction system including an electronic device, comprising:
    outputting, by a processor of the electronic device, audio information for playing content through a voice-based interface included in the electronic device;
    receiving, by the processor, a voice input of an utterer responsive to the output audio information through the voice-based interface;
    generating, by the processor, location information associated with the voice input of the utterer;
    determining, an operation associated with the playing of the content based on the voice input responsive to the output audio information and the location information associated with the voice input; and
    performing, by the electronic device, the determined operation associated with the playing of the content.

2. The multimodal interaction method of claim 1, wherein the location information associated with the voice input comprises at least one of a relative location or orientation of the utterer relative to the electronic device that is measured at a point in time or during a period of time associated with the reception of the voice input, whether the relative location or orientation is changed, a level of change in the relative location or orientation, and an orientation in which the relative location or orientation is changed.

3. The multimodal interaction method of claim 1, wherein the generating of the location information comprises generating the location information associated with the voice input based on a phase shift of the voice input that is input to a plurality of microphones included in the voice-based interface.

4. The multimodal interaction method of claim 1, wherein the electronic device comprises at least one of a camera and a sensor, and
    the generating of the location information comprises generating the location information associated with the voice input based on an output value of at least one of the camera and the sensor in response to receiving the voice input.

5. The multimodal interaction method of claim 1, wherein the determining of the operation associated with the playing of the content comprises integrating at least one of a tone of sound corresponding to the voice input, a pitch of the sound, and a command extracted by analyzing the voice input and the location information associated with the voice input.

6. The multimodal interaction method of claim 1, further comprising:
    receiving a measurement value that is measured by a sensor of a peripheral device interacting with the electronic device in association with the voice input, from the peripheral device,
    wherein the determining of the operation associated with the playing of the content comprises using the received measurement value.

7. The multimodal interaction method of claim 1, further comprising:
    receiving a measurement value that is measured by a sensor of a peripheral device interacting with the electronic device regardless of the voice input, from the peripheral device; and
    changing a setting associated with the playing of the content based on the received measurement value.

8. The multimodal interaction method of claim 1, wherein the audio information comprises information that requires a change in a location of the utterer, and
    the determining of the operation associated with the playing of the content depends on whether the voice input and the location information associated with the voice input meet a condition corresponding to the required information.

9. The multimodal interaction method of claim 1, wherein the content is provided through an external server communicating with the electronic device over a network, and
    the determining of the operation associated with the playing of the content comprises:
    transmitting the voice input and the location information associated with the voice input to the external server over the network;
    receiving, from the external server, operation information that is generated by the external server based on the voice input and the location information associated with the voice input; and
    determining the operation associated with the playing of the content based on the received operation information.

10. A non-transitory computer-readable storage medium storing a program, which when executed by a processor, causing the processor to perform the multimodal interaction method of claim 1.

11. A multimodal interaction system comprising:
    a voice-based interface; and
    at least one processor configured to execute computer-readable instructions,
    wherein the at least one processor is configured to
    output audio information for playing content through the voice-based interface,
    receive a voice input of an utterer responsive to the output audio information through the voice-based interface,
    generate location information associated with the voice input of the utterer,
    determine an operation associated with the playing of the content based on the voice input responsive to the output audio information and the location information associated with the voice input, and performing the determined operation associated with the playing of the content.

12. The multimodal interaction system of claim 11, wherein the at least one processor is configured to generate the location information associated with the voice input based on a phase shift of the voice input that is input to a plurality of microphones included in the voice-based interface.

13. The multimodal interaction system of claim 11, further comprising at least one of a camera and a sensor,
wherein the at least one processor is configured to generate the location information associated with the voice input based on an output value of at least one of the camera and the sensor in response to receiving the voice input.

14. The multimodal interaction system of claim 11, wherein the at least one processor is configured to determine the operation associated with the playing of the content by integrating at least one of a tone of sound corresponding to the voice input, a pitch of the sound, and a command extracted by analyzing the voice input and the location information associated with the voice input.

15. The multimodal interaction system of claim 11, wherein the at least one processor is configured to receive a measurement value that is measured by a sensor of a peripheral device interacting with the multimodal interaction system in association with the voice input, from the peripheral device, and
determine the operation associated with the playing of the content by using the received measurement value.

16. The multimodal interaction system of claim 11, wherein the at least one processor is configured to
receive a measurement value that is measured by a sensor of a peripheral device interacting with the multimodal interaction system regardless of the voice input, from the peripheral device, and
change a setting associated with the playing of the content based on the measurement value.

17. The multimodal interaction system of claim 11, wherein the audio information comprises information that requires an utterance of the utterer and a change in a location of the utterer, and
the at least one processor is configured to determine the operation associated with the playing of the content depending on whether the voice input and the location information associated with the voice input meet a condition corresponding to the required information.

18. The multimodal interaction system of claim 11, wherein the content is provided through an external server performing communication over a network, and
to determine the operation associated with the playing of the content, the at least one processor is configured to
transmit the voice input and the location information associated with the voice input to the external server over the network,
receive, from the external server, operation information that is generated by the external server based on the voice input and the location information associated with the voice input, and
determine the operation associated with the playing of the content based on the received operation information.

* * * * *